United States Patent [19]

Kawabata

[11] 4,429,927

[45] Feb. 7, 1984

[54] CASING HAVING A MOUNTING PORTION AT ITS INNER WALL SURFACE FOR RECEIVING A BEARING MEMBER THEREIN

[75] Inventor: Akira Kawabata, 2-24-7 Shimizu, Suginami-Ku Tokyo, Japan

[73] Assignees: Akira Kawabata; Sunny Co., Ltd., both of Japan; a part interest

[21] Appl. No.: 251,453

[22] Filed: Apr. 6, 1981

[51] Int. Cl.³ .............................................. F16C 35/06
[52] U.S. Cl. .................................................... 308/236
[58] Field of Search ...................... 308/15, 22, 27, 29, 308/178, 189 R, 236, 216, 207 R

[56] References Cited

U.S. PATENT DOCUMENTS

| | | | |
|---|---|---|---|
| 2,665,930 | 1/1954 | Stanley | 308/236 |
| 2,735,734 | 2/1956 | Kalikow | 308/236 X |
| 2,886,382 | 5/1959 | Baublys | 308/236 |
| 3,532,402 | 10/1970 | Beery et al. | 308/236 X |

Primary Examiner—Stanley N. Gilreath
Assistant Examiner—David J. Werner
Attorney, Agent, or Firm—Beveridge, DeGrandi & Kline

[57] ABSTRACT

A casing shaped from a light metal material by diecasting, the casing having formed at its inner wall surface a mounting portion having a circular inner surface, the mounting portion being adapted to receive a bearing member having a circular outer surface and serving to journal a shaft. The circular inner surface of the mounting portion has formed thereon a plurality of supporting protrusions spaced at predetermined intervals in the circumferential direction, and the bearing member is press-fitted into the mounting portion. Alternatively, the mounting portion into which the bearing member is to be press-fitted is defined by an annular protruding portion having formed therein a plurality of slits spaced at predetermined intervals in the circumferential direction.

4 Claims, 11 Drawing Figures

FIG. 7
FIG. 8
FIG. 10
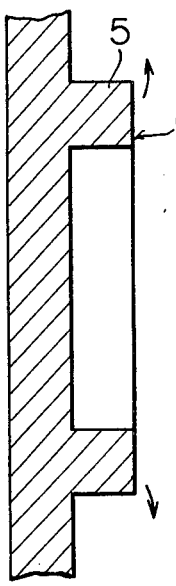
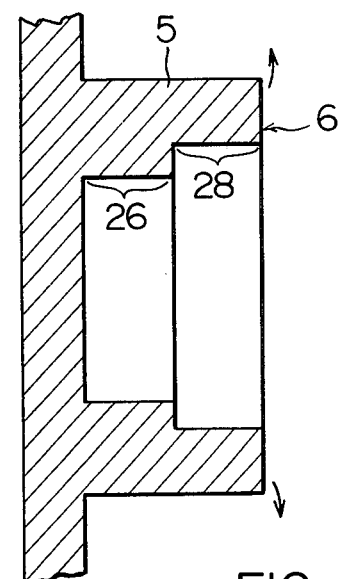
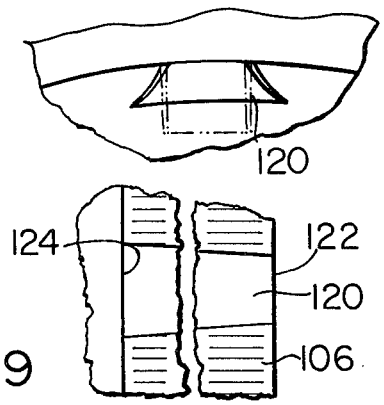
FIG. 9
FIG. 11
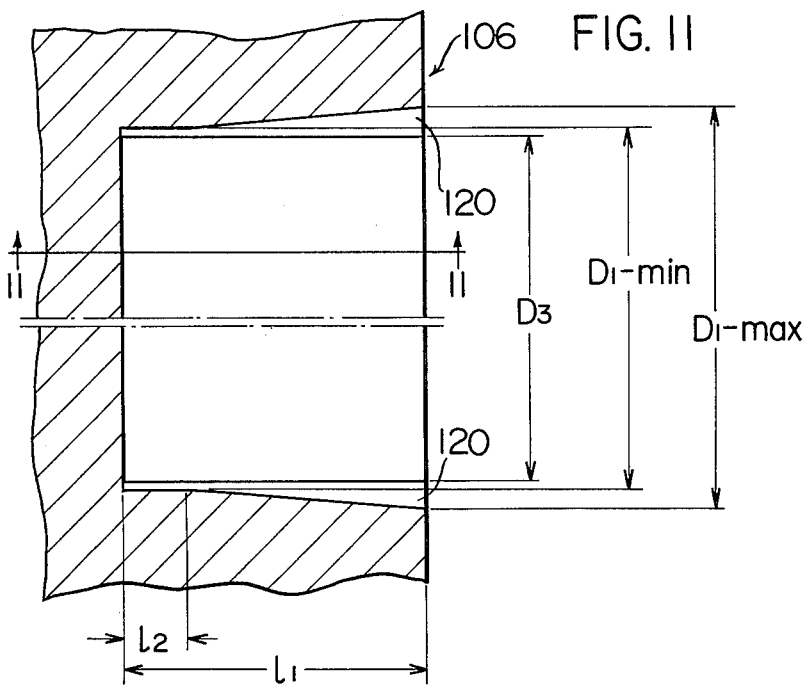

CASING HAVING A MOUNTING PORTION AT ITS INNER WALL SURFACE FOR RECEIVING A BEARING MEMBER THEREIN

FIELD OF THE INVENTION

This invention relates to a casing, and more specifically, to a casing shaped from a light metal material by diecasting and having a mounting portion at its inner wall surface for receiving a bearing member.

DESCRIPTION OF THE PRIOR ART

It is known to those skilled in the art that in a casing for a speed change gear, an electric motor, etc., a mounting portion having a circular inner surface is formed at its inner wall surface, and a bearing member having a circular outer surface and secured to a shaft is mounted to the mounting portion, thereby journalling the shaft within the casing.

In recent years, shaping of the aforesaid casing by die-casting from a light metal material such as aluminum or an aluminum-base alloy has been suggested and gained commercial acceptance. Since, however, it is important, as will be described in detail hereinbelow, that the mounting portion in conventional casings made by the die-casting method should be finished fairly precisely, the mounting portion requires precision machining after the die-casting operation. Naturally, the precision machining leads to the defect that the manufacturing process becomes complex and the cost of production increases.

SUMMARY OF THE INVENTION

It is a primary object of this invention therefore to provide a novel and excellent casing shaped from a light metal material by die-casting, which does not require precision machining at the mounting portion after the die-casting operation and can permit mounting of a bearing member for journalling a shaft to the mounting portion in the as-cast state.

As a result of extensive investigations, the present inventor has found to his surprise that when a plurality of supporting protrusions are formed circumferentially in spaced-apart relationship on the inner surface of a mounting portion which has a circular shape corresponding to the circular outer surface of a bearing member to be mounted and the bearing member is press-fitted into the mounting portion, gradients, dimensional errors, etc. incident to die-casing which are present on the inner surface of the mounting portion and the supporting protrusions formed thereon are compensated by the elastic or plastic deformation of the supporting protrusions, and therefore, the bearing member for journalling a shaft can be mounted to the mounting portion without the need to perform precision machining after the die-casting operation and therefore without increasing the cost of production.

According to this invention, there is provided a casing shaped from a light metal material by die-casting and having formed at its inner wall surface a mounting portion with a circular inner surface, the mounting portion being adapted to receive a bearing member having a circular outer surface and serving to journal a shaft, characterized in that the circular inner surface of the mounting portion into which the bearing member is to be press-fitted has formed thereon a plurality of supporting protrusions spaced at predetermined intervals in the circumferential direction.

In one embodiment of the casing of this invention, the supporting projections are uniformly disposed in the circumferential direction at equal intervals over the entire under surface of the mounting portion, and the projecting heights of the supporting protrusions are the same.

In a second embodiment of the casing of the invention, the supporting protrusions are disposed in that part of the circular inner surface of the mounting portion which covers an angular range of approximately 180 degrees, and the projecting heights of the supporting protrusions progressively decrease as over that angular range.

The present inventor has also found that when a plurality of slits are formed in an annular protruding portion defining the mounting portion in the circumferential direction in spaced-apart relationship, and a bearing member is press-fitted into the annular protruding portion, gradients, dimensional errors, etc. incident to die-casting which are present on the inner surface of the annular protrusion are compensated by the elastic or plastic deformation of the annular protrusion, and therefore, the bearing member for journalling a shaft can be mounted to the mounting portion without the need to perform precision machining after the die-casting operation and thus without increasing the cost of production.

In another aspect, therefore, the present invention provides a casing shaped from a light metal material by die-casting and having formed at its inner wall surface a mounting portion composed of an annular protruding portion with a circular inner surface, the mounting portion being adapted to receive a bearing member having a circular outer surface and serving to journal a shaft, characterized in that the annular protrusion defining the mounting portion into which the bearing member is to be press-fitted has formed therein a plurality of slits spaced at predetermined intervals in the circumferential direction.

BRIEF DESCRIPTION OF THE DRAWINGS

FIG. 7 is a partial sectional view of the mounting portion shown in FIG. 3;

FIG. 8 is a partial sectional view showing the mounting portion in a fourth embodiment of the casing constructed in accordance with this invention;

FIG. 9 is a partial sectional view showing the configuration of the mounting portion in the Example of the invention; and FIG. 10 is an enlarged partial front elevation showing a modification of a supporting protrusion in the Example of the invention; and FIG. 11 is a broken fragmentary view taken along line 11—11 of FIG. 9.

DETAILED DESCRIPTION OF THE PREFERRED EMBODIMENTS

Figure 1:
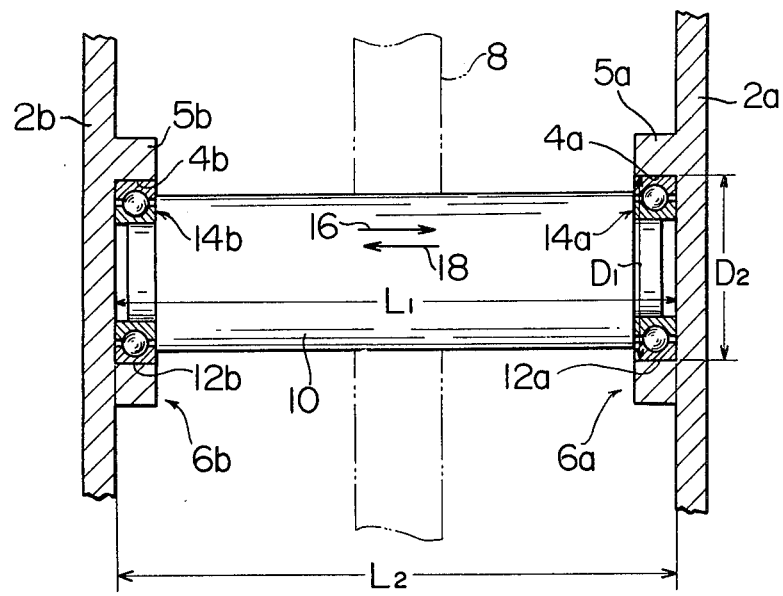
FIG. 1 is a partial sectional view showing a conventional casing.

For a better understanding of the present invention, the defects of a conventional casing made by a die-casting method are described at some length with reference to FIG. 1 before going into details about the embodiments of the casing constructed in accordance with this invention.

A casing for a speed change gear mechanism or the like has side walls 2a and 2b positioned opposite to each other, and mounting portions 6a and 6b, defined respectively by annular protruding portions 5a and 5b having circular inner surfaces 4a and 4b, are formed on the inner surfaces of the side walls 2a and 2b at corresponding positions. Bearing members 14a and 14b having circular outer surfaces 12a and 12b respectively, on the other hand, are secured to the opposite ends of a shaft 10 to which an element 8 such as a gear, shown by a dotted line, is fixed. These bearing members 14a and 14b are fitted into the mounting portions 6a and 6b. In such a construction, it is first important that the distance $L_1$ between the end surfaces of the two mounting portions 6a and 6b should be substantially equal to the distance $L_2$ between the outside surfaces of the bearing members 14a and 14b located on both sides of the shaft 10. If $L_1$ is larger than $L_2$ and the value of $L_1-L_2$ becomes excessive, the following inconvenience will occur. For example, if the element 8 is a worm gear to be in meshing engagement with another gear not shown, a thrust load exerted on the shaft 10 is reversed in direction when the rotation of the element 8 is reversed. At this time, the shaft 10 is moved in the direction shown by an arrow 16 or 18 to cause the bearing member 14a or 14b to collide with the end surface of the mounting portion 6a or 6b and consequently, noises, vibrations, etc. occur. Conversely, if $L_1$ is smaller than $L_2$, it is intrinsically impossible to mount the bearing members 14a and 14b to the mounting portions 6a and 6b respectively. If, however, they are forced into the mounting portions 6a and 6b by utilizing, for example, the elastic displacement of the side walls 2a and 2b, a large thrust load is applied from the mounting portions 6a and 6b to the bearing members 14a and 14b. Thus, as will be readily appreciated, the function of the bearing members 14a and 14b to journal the shaft 10 is impaired.

Secondly, it is important that the inside diameter $D_1$ of each of the inner surfaces 4a and 4b of the mounting portions 6a and 6b should be substantially equal to the outside diameter $D_2$ of the bearing member 14a and 14b. If $D_1$ is excessively smaller than $D_2$, the bearing members 14a and 14b naturally cannot be fitted into the mounting portions 6a and 6b, and if $D_1$ is larger than $D_2$, mounting of the bearing members 14a and 14b to the mounting portions 6a and 6b causes "chattering".

Figure 2:
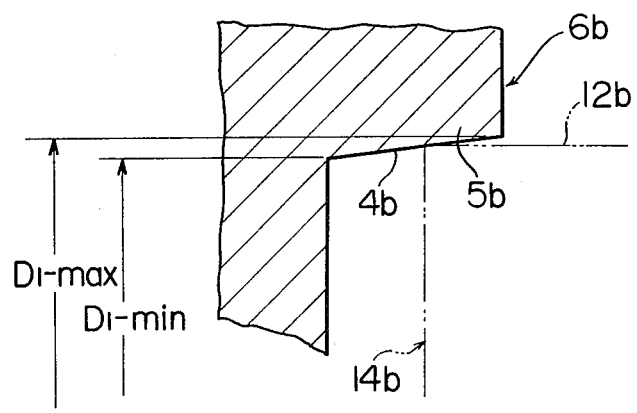
FIG. 2 is a partial sectional view showing on an enlarged scale a part of the mounting portion of the casing shown in FIG. 1.

As is well known to those skilled in the art, the end surfaces of the mounting portions 6a and 6b can be molded with sufficient accuracy according to the die-casting method, and therefore, the distance $L_1$ between the mounting portions 6a and 6b can be made substantially equal to the distance $L_2$ between the outside surfaces of the bearing members 14a and 14b with sufficient accuracy. However, as shown in FIG. 2 which shows the mounting portion 6b on an enlarged scale, some taper is necessarily formed in the inner surfaces 4a and 4b of the mounting portions 6a and 6b owing to the draft of the die used in die casting. Accordingly, it is impossible to make the inside diameter $D_1$ of the inner surfaces 4a or 4b substantially equal to the outside diameter $D_2$ of the outer surfaces 12a or 12b of the bearing members 14a or 14b.

Accordingly, in the prior art, the inner surfaces 4a and 4b of the mounting portions 6a and 6b are subjected to precision machining after forming the casing by die-casting. Precision machining in addition to the die-casting naturally increases the cost of production of the casing. Moreover, the precision machining itself produces an error owing to a positioning error in mounting the workpiece on a machine tool, a machining error, etc. Accordingly, even when the inner surfaces 4a and 4b are subjected to precision machining, the inside diameter $D_1$ of the inner surface 4a or 4b slightly varies owing to the machining error, and some variations occur in the relation between the element 8 fixed to the shaft 10 and another element (not shown).

An attempt has been made to set the minimum inside diameter $D_{1-min}$ of the inner surface 4a or 4b of the mounting portion 6a or 6b smaller than the outside diameter $D_2$ of the outer surface 12a or 12b of the bearing member 14a or 14b and the maximum outside diameter $D_{1-max}$ of the inner surface 4a or 4b of the mounting portion 6a or 6b larger than the outside diameter $D_2$ of the outer surface 12a or 12b of the bearing member 14a or 14b, and press-fit the bearing members 14a and 14b into the mounting portions 6a and 6b as shown by the dotted line in FIG. 2 while the casing is in the as-cast state without subsequent precision machining. In such an attempt, however, the inside surfaces 4a and 4b of the mounting portions 6a and 6b are partly shaved away by the edge portions of the bearing members 14a and 14b during press-fitting, and the resulting metal dust gathers between the end surfaces of the mounting portions 6a and 6b and the outside surfaces of the bearing members 14a and 14b. Owing to the metal dust, the outer surfaces of the bearing members 14a and 14b cannot be contacted as desired with the end surfaces of the mounting portions 6a and 6b, and mounting of the bearing members to the mounting portions becomes incomplete. If by some method, the metal dust is removed and the outer surfaces of the bearing members 14a and 14b is forcibly contacted as desired with the end surfaces of the mounting portions 6a and 6b, a considerable gap exists between the inner surfaces 4a and 4b of the mounting portions 6a and 6b and the outer surfaces 12a and 12b of the bearing members 14a and 14b, as can be readily seen from FIG. 2. Consequently, the supporting of the bearing members 14a and 14b in the radial direction becomes insufficient.

The present invention provides a casing free from the aforesaid defects of the conventional casing formed by the die-casting method. Some embodiments of the casing of the invention are described in detail.

Figure 3:
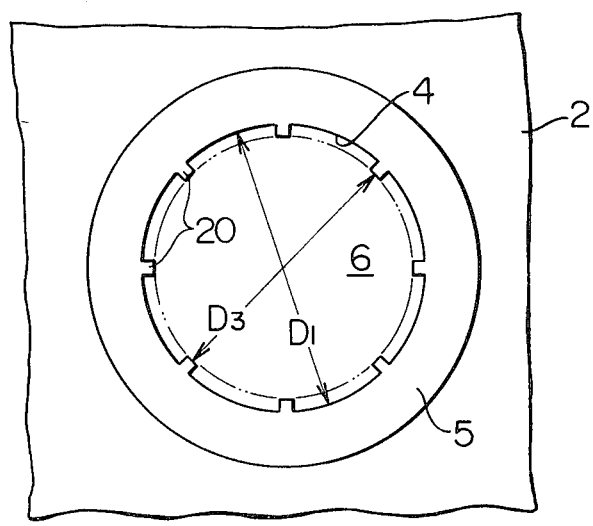
FIG. 3 is a partial front elevation of the mounting portion in a first embodiment of the casing constructed in accordance with this invention.

Referring to FIG. 3 which shows a mounting portion in a first embodiment of the casing constructed in accordance with this invention, the casing shaped by die-casting from a suitable light metal material such as aluminum or an aluminum-base alloy has formed on the inner surface of its side wall 2 a mounting portion 6 defined by an annular protruding portion 5 having a circular inner surface 4 as in the mounting portions in the conventional casing. According to this invention, a plurality of supporting protrusions 20 are formed at suitable intervals in the circumferential direction on the circular inner surface 4. In the embodiment illustrated in FIG. 3, eight supporting protrusions 20 are formed at equal intervals in the circumferential direction. The projecting heights of these supporting protrusions 20 from the circular inner surface 4 are substantially the same. The supporting protrusions 20 may be formed over the entire inner surface 4 in the axial direction as shown in FIG. 3, or they may be formed over only part of the circular inner surface 4.

It is important that in the mounting portion 6, the inside diameter $D_1$ of the circular inner surface 4 should be slightly larger than the outside diameter $D_2$ of the circular outer surface 12 of a bearing member to be mounted to the mounting portion 6. On the other hand, it is important that the diameter $D_3$ of a circle defined by the projecting ends of the supporting protrusions 20 should be set slightly smaller than the outside diameter $D_2$ of the circular outer surface of the bearing member 14. Preferably, the projecting height of each supporting protrusion 20 is generally about 5/100 mm to about 10/100 mm although varying depending upon the inside diameter $D_1$ of the circular inner surface 4, the outside diameter $D_2$ of the circular outer surface 12 and the material of which the casing is made by die-casting (in the drawings, the projecting heights of the supporting protrusions 20 are exaggerated for clear illustration).

In the casing of the invention described above, the bearing member 14 for journalling a shaft 10 is mounted to the mounting portion 6 by press-fitting without any machining after the die-casting operation. In the die-casting described hereinabove, the diameter $D_3$ of the circle defined by the projecting ends of the supporting protrusions 20 and the inside diameter $D_1$ of the circular inner surface 4 of the mounting portion 6 cannot be formed precisely to predetermined values. In the casing of the invention, however, if only the inside diameter $D_1$ is made larger than the outside diameter $D_2$ of the outer surface 12 of the bearing member 14 and the diameter $D_3$ is made smaller than the outside diameter $D_2$ of the outer surface 12 of the bearing member 14, the supporting protrusions 20 are elastically or plastically deformed during the press-fitting of the bearing member 14 into the mounting portion 6. Such elastic or plastic deformation causes the diameter $D_3$ to be equal to the outside diameter $D_2$ of the outer surface 12 of the bearing member 14, and thus, the bearing member 14 is mounted properly to the mounting portion 6 as desired. In view of this, the circumferential width of each supporting protrusion 20 should not be large enough to hamper the elastic or plastic deformation of the supporting protrusions 20 in press-fitting the bearing member 14 into the mounting portion 6.

Although, as stated hereinabove, the dimensions of the individual parts of the mounting portion 6, particularly the inside diameter $D_1$ of the circular inner surface 4 and the diameter $D_3$ of the circle defined by the projecting ends of the supporting protrusions 20, cannot be made sufficiently precisely by die-casting, the dimensions of the individual parts of the mounting portion 6 remain substantially the same in casings shaped by die-casting from the same die. Thus, in the casings of this invention produced by die-casting using the same die, mounting of the bearing member 14 to the mounting portion 6 does not vary but remains substantially the same. Accordingly, when the casing is, for example, a casing for a speed change gear mechanism, substantially the same and proper gear engagement can be achieved in all casings without variations by first making a die, molding a casing by die-casting using the die, then properly setting the amounts of displacement of a gear to be fixed to the shaft 10 and another gear to be engaged with this gear.

Figure 5:
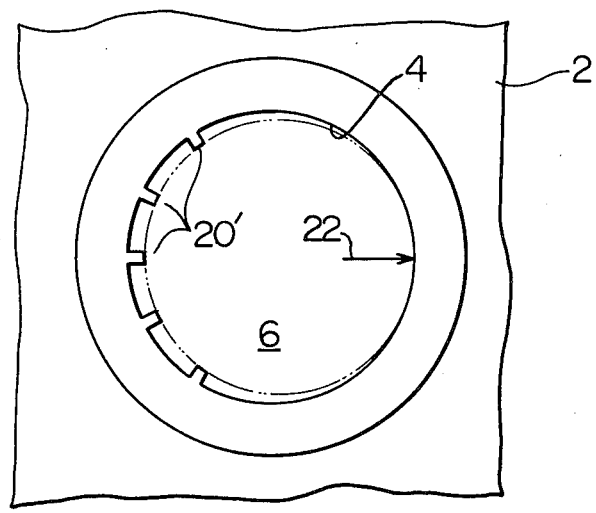
FIG. 5 is a partial front elevation showing the mounting portion in a second embodiment of the casing constructed in accordance with this invention.

FIG. 5 shows the mounting portion of a second embodiment of the casing constructed in accordance with this invention. In the second embodiment shown in FIG. 5, a plurality of supporting protrusions 20' are located in that part of the circular inner surface 4 of the mounting portion 6 which corresponds to an angular range of 180° or less, and the projecting heights of the supporting protrusions 20' are progressively decreased in both directions over the angular range from a maximum height on the protrusion nearest the center of the aforesaid angular range.

When the casing is a casing for a speed change gear mechanism, the gear to be accomodated within the casing (the element B shown by the dotted line in FIG. 1) is brought into meshing engagement with another gear to be accomodated within the casing. As is well known to those skilled in the art, when the two gears are in mesh with each other, a force in a direction tending to move the two gears away from each other, i.e. in the centrifugal direction, is exerted on the individual gears and therefore also on shafts to which the gears are fixed and bearing members journalling the shafts. Accordingly, in the mounting portion 6 in which the bearing member 14 has been press-fitted, a force is exerted on the mounting portion 6 from the bearing member 14 concentrated in a specified angular direction (for example, in the direction shown by an arrow 22 in FIG. 5). If the force acting concentratingly on the mounting portion 6 concentrated in the specified angular direction and supporting protrusions are present in the aforesaid specified angular direction and in its vicinity, a large force acts on these supporting protrusions to further deform the supporting protrusions elastically or plastically and cause chattering in the mounting of the bearing member, and in some case, the supporting protrusions may be damaged.

In the second embodiment shown in FIG. 5, however, supporting protrusions are not disposed on that part of the circular inner surface 4 of the mounting portion which corresponds to an angular range of at least about 180° with its center being in the direction shown by the arrow 22 corresponding to the centrifugal direction of the gears. The supporting protrusions 20' are localized at that part of the circular inner surface of the mounting portion which corresponds to an angular range of less than about 180° with its center being in a direction opposite to the direction shown by the arrow 22. In the second embodiment, no supporting protrusion is present in the direction shown by the arrow 22 and in its vicinity, and in this area, the circular other surface of the bearing member makes direct contact with the circular inner surface 4 of the mounting portion 6. Thus, the aforesaid force concentrated in the direction shown by the arrow 22 is directly transmitted to the circular inner surface 4 of the mounting portion 6 which has much higher strength than the supporting protrusions. Accordingly, with the force acting in the direction of the arrow 22, chattering in the mounting of the bearing member or damage of the mounting portion does not occur.

Figure 4:
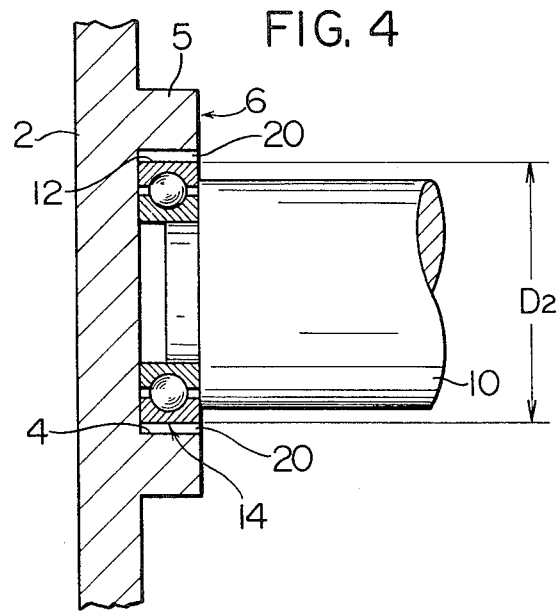
FIG. 4 is a partial sectional view of the mounting portion shown in FIG. 3.
Figure 6:
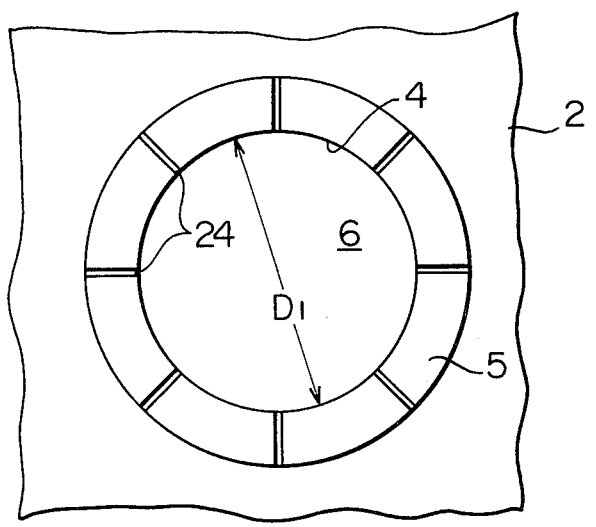
FIG. 6 is a partial front elevation showing the mounting portion in a third embodiment of the casing constructed in accordance with this invention.

FIG. 6 shows a third embodiment of the mounting portion of the casing constructed in accordance with this invention. In the third embodiment illustrated in FIG. 6, a plurality of slits 24 are formed at suitable intervals in the circumferential direction in the annular protruding portion 5 defining the mounting portion 6, instead of forming the supporting protrusions 20 at suitable intervals in the circumferential direction on the circular inner surface 4 of the mounting portion 6. In the embodiment illustrated in FIG. 6, eight slits 24 are formed at equal intervals in the circumferential direction. It is important in the third embodiment that the inside diameter $D_1$ of the circular inner surface 4 should be set slightly smaller than the outside diameter $D_2$ of the circular outer surface 12 of the bearing member 14 (FIG. 4) to be mounted thereto.

In the third embodiment, too, the bearing member 14 (FIG. 4) for journalling the shaft 10 (FIG. 4) having a gear (see FIG. 1) fixed thereto can be mounted by press-fitting, for example by means of a press, onto the mounting portion 6 without the need for any machining after the die-casting operation. As stated hereinabove, the inside diameter $D_1$ of the circular inner surface 4 of the annular protruding portion 5 cannot be adjusted precisely to a predetermined value in die casting. If the inside diameter $D_1$ is made smaller than the outside diameter $D_2$ of the outer surface 12 of the bearing member 14 in the third embodiment, the annular protruding portion 5 is elastically or plastically deformed as shown by an arrow in FIG. 7 during press-fitting of the bearing member 14 in the mounting portion 6 because of the presence of the slits 24. By this elastic or plastic deformation, the diameter $D_1$ can be made equal to the outside diameter $D_2$ of the outer surface 12 of the bearing member 14 (FIG. 4) and therefore, the bearing member 14 is properly fitted into the annular protruding portion 5 as required. In view of this, the slits 24 are desirably arranged at such intervals that the annular protruding portion 5 as a whole can be substantially uniformly deformed elastically or plastically during press-fitting of the bearing member 14 into the mounting portion 6.

FIG. 8 shows a fourth embodiment of the mounting portion of the casing constructed in accordance with the present invention. In the fourth embodiment shown in FIG. 8, the annular protruding portion 5 is formed in a two-stage structure consisting of a base portion 26 having an inside diameter much smaller than the outside diameter of the bearing member 14 (FIG. 4) and an upper portion 28 having an inside diameter slightly smaller than the outside diameter of the bearing member 14, and the slits 24 (see FIG. 6) are formed so as to extend from the upper portion 28 to the base portion 26. As can be readily appreciated from FIGS. 7 and 8, the annular protruding portion 5 in the fourth embodiment is deformed more easily than in the third embodiment shown in FIGS. 6 and 7 during press-fitting of the bearing member 14 (FIG. 4) into the mounting portion 6 defined by the upper portion 28 of the annular protruding portion 5. Accordingly, press-fitting of the bearing member 14 (FIG. 4) is relatively easy.

EXAMPLE

A casing having a mounting portion 106 of the configuration shown in FIG. 9 at its inner wall surface for mounting a deep-groove ball bearing (the diameter $D_2$ of its circular outer surface is 28 mm) in accordance with JIS 6001 was molded by die-casting from an aluminum material.

The dimensional details of the individual parts of the mounting portion were as follows:

| | |
|---|---|
| Depth $l_1$ of the mounting portion 106 | 6.00 mm |
| Depth $l_2$ of that part of the bottom of the mounting portion 106 which does not contain a draft | 1.00 mm |
| Maximum inside diameter $D_{1\text{-}max}$ of the circular inner surface of the mounting portion 106 | 28.25 mm |
| Minimum inside diameter $D_{1\text{-}min}$ of the circular inner surface of the mounting portion 106 | 27.95 mm |
| Diameter $D_3$ of a circle defined by the projecting ends of the supporting protrusions 120 | 27.80 mm |

Twelve supporting protrusions 120 were disposed at equal intervals in the circumferential direction on the circular inner surface of the mounting portion 106. As depicted in FIG. 11, the width in the circumferential direction of the supporting protrusions 120 was adjusted to 0.4 mm at the receiving end 122 (opening end) of the mounting portion 106 and to 0.5 mm at the bottom 124 of the mounting portion 106 (therefore, the draft in the supporting projection 120 existed on both side surfaces in the circumferential direction).

When the deep-groove ball bearing (JIS 6001) was press-fitted into the mounting portion 106, it could be mounted in good condition as required. The configuration of the supporting protrusions 120 was observed after the mounting. It was found that while the supporting protrusions 120 had the configuration shown by the dotted line in FIG. 10 before mounting, it was deformed to the configuration shown by the solid line in FIG. 10 after mounting.

What is claimed is:

1. In a casing shaped from a light metal material by die-casting and having formed on its inner wall surface a mounting portion with a receiving end, a circular inner surface, and a bottom end, said mounting portion being adapted to receive a bearing member having a circular outer surface and serving to journal a shaft; the improvement comprising a plurality of supporting protrusions extending from the circular inner surface of the mounting portion into which the bearing member is to be press-fitted and spaced at predetermined intervals in the circumferential direction about the circular inner surface, the circumferential width of each supporting protrusion increasing from the receiving end of the mounting portion to the bottom end of the mounting portion, the supporting protrusions having projecting ends defining a circle of substantially uniform diameter.

2. The casing of claim 1 wherein the supporting protrustions are uniformly disposed circumferentially about the entire circular inner surface of the mounting portion at equal intervals so that the predetermined intervals are equal over the entire circumference of the circular inner surface.

3. In a casing shaped from a light metal material by die-casting and having formed on its inner wall surface a mounting portion with a receiving end, a bottom end, and a circular inner surface, said mounting portion being adapted to receive a bearing member having a circular outer surface and serving to journal a shaft; the improvement comprising a plurality of supporting protrusions extending from the circular inner surface of the mounting portion into which the bearing member is to be press-fitted and spaced at predetermined intervals in the circumferential direction about a portion of the circular inner surface extending over an angular range of less than about 180°, with the projecting heights of the supporting protrusions progressively decreasing in both directions over the angular range from a maximum height on the protrusion nearest the center of the angular range.

4. In a casing as claimed in claim 3, the further improvement wherein the circumferential width of each supporting protrusion increases from the receiving end of the mounting portion to the bottom end of the mounting portion, the supporting protrusions having projecting ends defining a circle of substantially uniform diameter.

* * * * *